April 6, 1926.

E. H. TRICK 1,579,973

BOLL WEEVIL CATCHER

Filed June 14, 1924 4 Sheets-Sheet 1

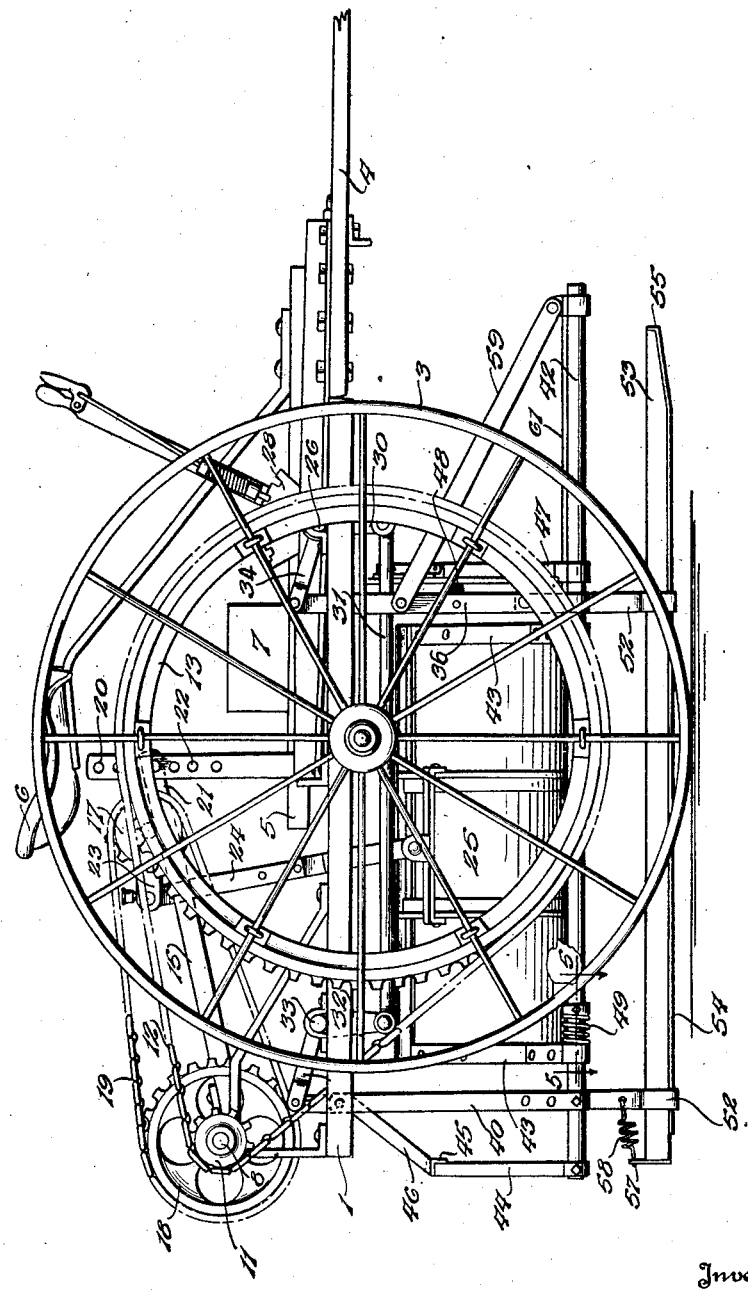

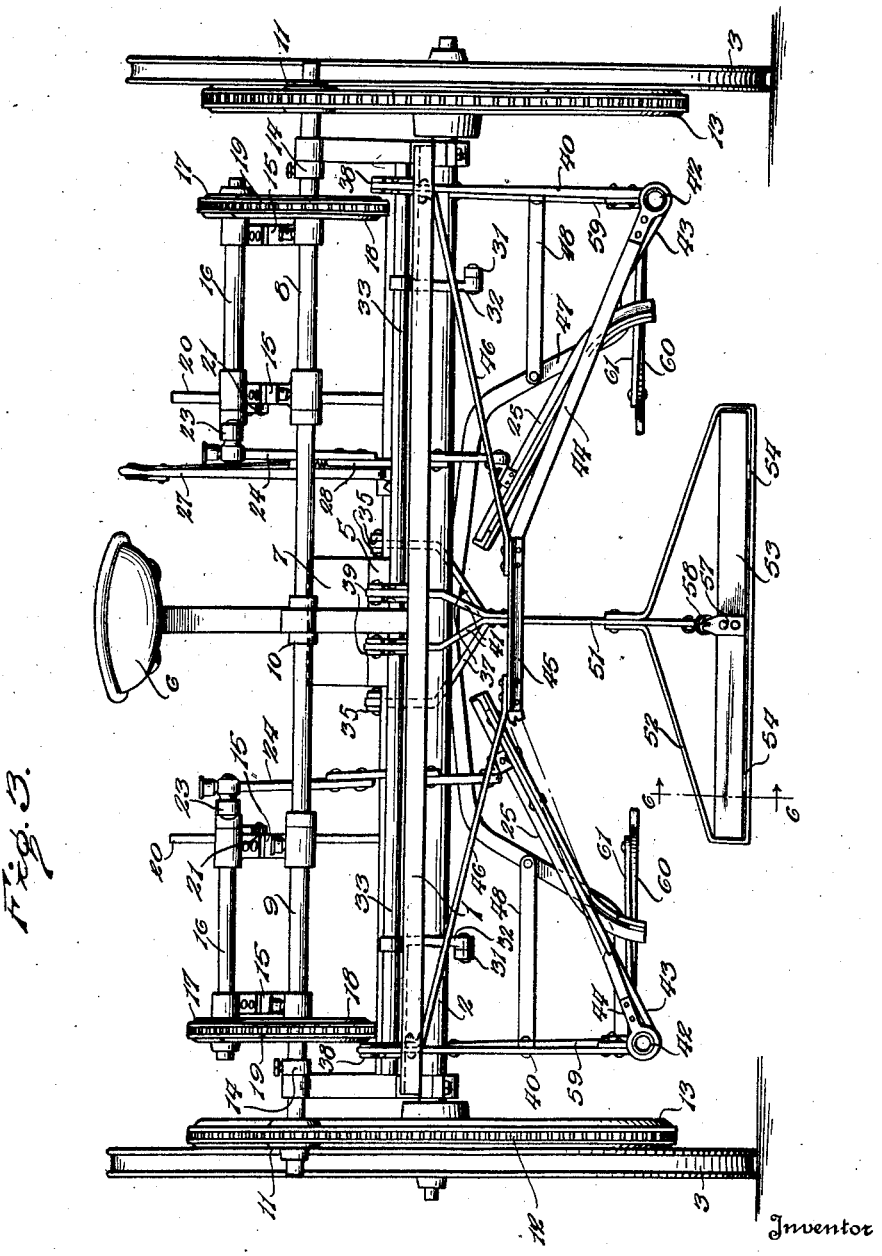

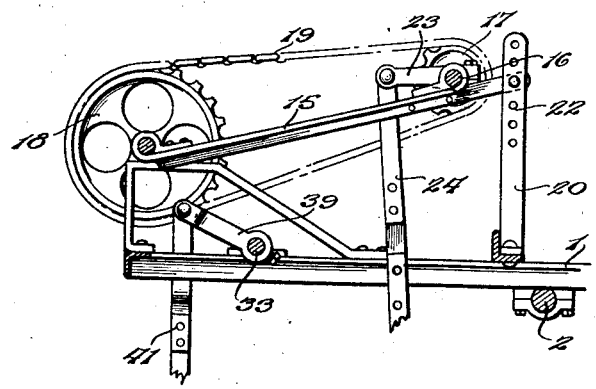
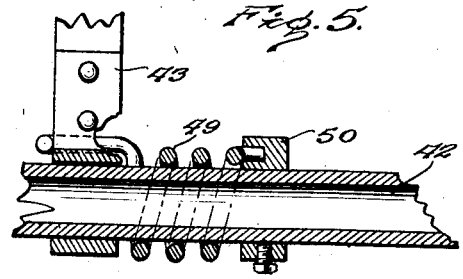
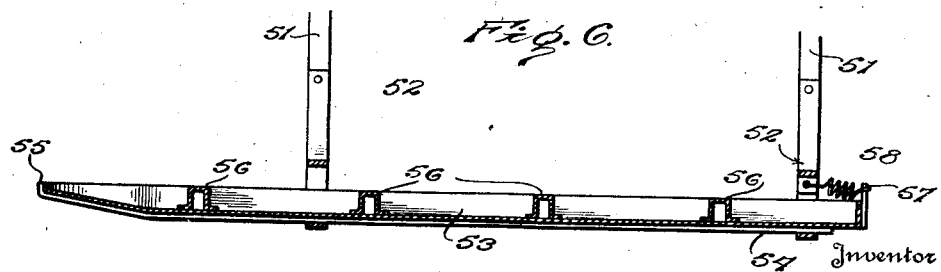

Patented Apr. 6, 1926.

1,579,973

UNITED STATES PATENT OFFICE.

EDGAR H. TRICK, OF SAN ANTONIO, TEXAS, ASSIGNOR OF ONE-HALF TO RUDOLPH A. REHBERG, OF SAN ANTONIO, TEXAS.

BOLL-WEEVIL CATCHER.

Application filed June 14, 1924. Serial No. 719,979.

*To all whom it may concern:*

Be it known that I, EDGAR H. TRICK, a citizen of the United States, residing at San Antonio, in the county of Bexar and State of Texas, have invented certain new and useful Improvements in Boll-Weevil Catchers, of which the following is a specification.

My invention relates to boll weevil catchers and has for its object the provision of a novel machine which may be drawn over a field along rows of cotton plants and beat from the plants the insects feeding thereon as well as the bolls which have been injured and dead foliage. The invention seeks to provide novel means for operating the beaters, and also provide means for adjusting the beaters and the parts cooperating therewith to the heights of the plants. Other objects will appear incidentally in the course of the following description, and the invention resides in certain novel features which will be hereinafter first fully described and then more particularly pointed out in the appended claims.

In the drawings:

Fig. 2 is a side elevation of the same;

Fig. 3 is a rear elevation with parts broken away;

Fig. 4 is a detail sectional elevation of a part of the operating mechanism, the section being taken on the line 4—4 of Fig. 1;

Fig. 5 is an enlarged detail section on the line 5—5 of Fig. 2, and

Fig. 6 is a detail section on the line 6—6 of Fig. 3.

Figure 1:
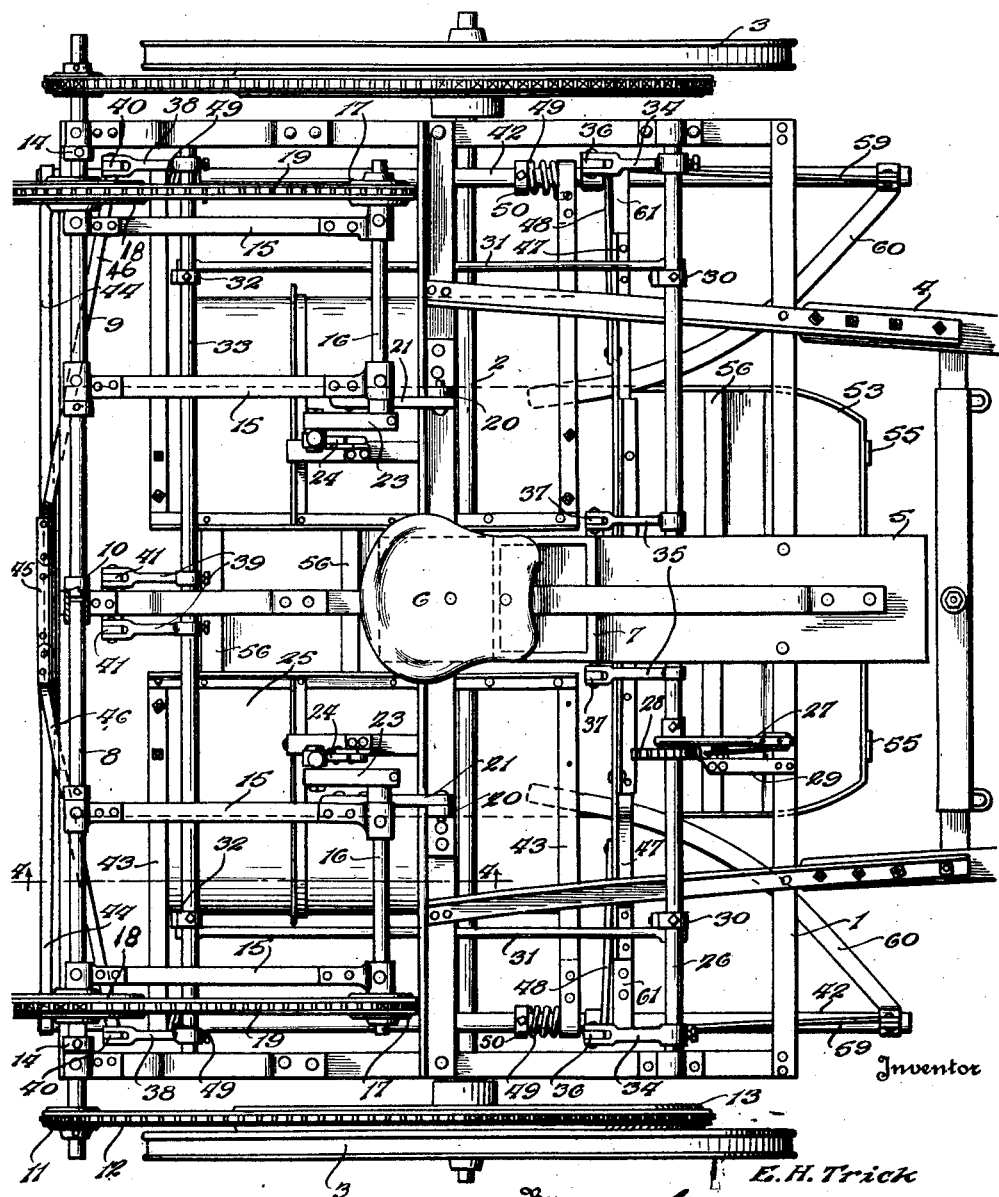
Figure 1 is a plan view of a machine embodying my invention.

In carrying out the invention, I employ a main frame 1 which is preferably rectangular in form and constructed of angle bars arranged longitudinally and transversely and rigidly secured together. This frame is carried by an axle 2, upon the ends of which are mounted ground wheels 3, and draft bars 4 are secured to the frame and project therefrom in any convenient or preferred manner. A narrow platform 5 is also secured upon the frame at the transverse center thereof, and this platform supports a seat 6 and a tool box 7.

Journaled in suitable bearings at the rear of the main frame are alined shafts 8 and 9 which have their inner ends supported in a coupling sleeve or bearing 10, as shown most clearly in Fig. 1, and secured upon the outer ends of said shafts are sprocket pinions 11 which are driven through chains 12 trained around sprocket gears 13 secured to the inner sides of the ground wheels 3 in any convenient manner. Stop collars 14 are secured upon the shafts 8 and 9 adjacent the inner sides of the bearings in which they are journaled so as to prevent endwise movement of the shafts, and fitted loosely about the shafts are the forwardly extending arms or frames 15 which carry transverse shafts 16 at their front ends. Upon the outer end of each shaft 16 is a pinion 17 and trained about the said pinion and a sprocket gear 18 upon the shaft 8 or 9, as the case may be, is a sprocket chain 19 so that the rotation of the shafts 8 and 9 will be transmitted to the sprockets 17 and thence to the shafts 16 in an obvious manner. Secured upon a cross bar of the main frame 1 adjacent the forward ends of the frames or arms 15 are standards 20, and extensions 21 of the frames 15 are secured to the said standards, the standards being provided with a plurality of openings 22 in their upper portions, through any one of which the connecting bolt may be inserted so that the front end of the frame 15 may be supported at the desired height. Each shaft 16 is equipped at its inner end with a crank 23 to which is pivoted the upper end of a pitman 24, the lower end of which is pivotally connected to the subjacent beater 25. The pitman 24 is preferably constructed in a plurality of sections, as shown in Figs. 3 and 4, so that the length of the pitman may be varied as circumstances may suggest. It will be readily noted that as the machine is drawn forward the motion of the ground wheels will be transmitted through the described gearing to the shafts 16 and the pitman 24 thereby caused to impart vertical oscillation to the beaters.

Adjacent the front end of the main frame, a rock shaft 26 is mounted thereon, and this shaft is controlled by a hand lever 27 secured thereto and cooperating with a segment 28 carried by a bracket 29 secured upon the front bar of the frame 1. Cranks 30 are secured upon the shaft 26 and normally depend therefrom, connecting rods 31 being pivoted to the lower ends of the said cranks and extending rearwardly therefrom to be pivoted to the lower ends of similar cranks 32 secured to and normally depending from a rock shaft 33 which is mounted in suitable bearings upon the main frame adjacent the rear end thereof. Adjacent the outer ends and the center of the front rock shaft 26, cranks 34 and 35 are secured thereto and extend normally rearwardly therefrom and to the free ends of the said cranks are pivoted the upper ends of hangers 36 and 37 respectively. Cranks 38, corresponding to the cranks 34, are secured upon the shaft 33 and cranks 39, corresponding to the cranks 35, are also secured upon said shaft, hangers 40 being pivotally attached to the cranks 38 and hangers 41 being pivotally attached to the cranks 39. In the lower ends of the hangers 36 and 40 are rotatably fitted the rods 42 which are preferably tubular to reduce the weight, and rotatably fitted upon these rods are hinge straps 43 which extend inwardly and upwardly from the rods and are secured upon the upper sides of the beaters. The tubular rods, which constitute pintles for the hinges, are held in their proper spaced relation by brace members 44 extending inwardly and upwardly at the rear end of the machine and having their inner upper ends connected by a bar 45, while additional brace members 46 extend from the ends of said bar 45 upwardly and outwardly to the hangers 40. Adjacent the front end of the frame, an arched brace 47 has its ends fitted around the rods 42, and coupling bars 48 extend between the sides of the arched brace 47 and the hangers 36.

When the hand lever 27 is swung rearwardly, the cranks 34 and 35 will be swung downwardly and the cranks 30 forwardly, the motion of the latter cranks being transmitted through the connecting rods 31 to the cranks 32 so that corresponding movement will occur in the shaft 33 and the cranks 38 will be swung downwardly. As a result of this movement, the hangers 36 and 40 will be lowered and the rods 42 and the parts mounted thereon and cooperating therewith will be likewise lowered so that the beaters will be adjusted to act on young low plants. Reverse adjustment is effected by swinging the hand lever 27 forwardly so that the beaters may be very easily and quickly adjusted to the height of the plants. Lengthening or shortening of the pitmen 24 or shifting of the frames 15 vertically relative to the standards 20 will obviously effect such compensation between the shafts 16 and the beaters as may be necessary.

Adjacent each hinge member 43, a spring 49 is coiled around the adjacent rod 42 and has one end engaged under the hinge member, as shown most clearly in Fig. 5, and its other end fitted in a collar or abutment 50 secured upon the rod. When the inner free edge of the beater is depressed in the operation of the machine, the spring will be put under increased tension so that, when the downwardly applied force is removed, the spring will aid in returning the beater to its upper position.

The hangers 37 and 41 disposed adjacent the medial longitudinal line of the machine are respectively brought together below the main frame to form a standard or hanger bar 51 and to the lower end of each of said bars 51 is secured a loop 52 disposed transversely of the machine and constituting the main supports for a pan 53. The loops are connected by longitudinally extending bars 54 and the pan 53 extends through the loops and rests upon the said bars, the front ends of the said bars being turned upwardly, as shown at 55, to form stops for the pan. A bracket 57 is secured upon the rear end of the pan 53 and projects above the top thereof, a spring 58 being disposed between and attached to the said bracket and the lower end of the adjacent hanger bar 51 so that the pan will be held against the front upturned ends 55 of the bars 54 and displacement rearwardly by the plants between which it is drawn will be avoided. To prevent buckling of the pan, ridges or cross bars 56 may be provided therein, and these ridges or cross bars will minimize the splashing of any poison or other liquid which may be placed in the pan and, consequently, will reduce loss of the same.

Additional supports for the rods or hinge pins 42 may be provided by braces 59 extending between the front ends of the rods and the hangers 36, and deflectors 60 are provided in the form of bars extending inwardly and rearwardly from the front ends of the rods, as shown clearly in Fig. 1, these bars preferably following curved lines. To properly support the free ends of these deflectors, brace bars 61 are provided and extend between the said deflectors, adjacent the inner free ends thereof, and the rods, the lower ends of the brace 47 being also secured to these brace bars 61 so that a rigid structure will be attained without interfering with the pivotal movement of the beaters about the rods.

It is thought the operation of the machine will be readily understood from the foregoing description, taken in connection with the accompanying drawings. The machine is intended to act upon two rows of plants, the pan traveling between the rows and each beater being disposed over one of the rows while the ground wheels travel in the furrows at the outer sides of the rows over which the beaters are respectively disposed. As the machine is drawn along, the rotation of the ground wheels will be transmitted through the described gearing to the shaft 16 and, through the connections of said shafts with the beaters, the beaters will be rocked or oscillated about the rods 42. The forward travel of the machine brings the deflectors 60 against the stems of the plants and the plants are thereby bent over the pan 55. The bending of the plants will suffice to cause the grown weevils to at once fall therefrom into the pan while the younger more tenacious insects will be caused to drop therefrom by the impacts of the beaters upon the plants. The beaters are preferably plates of relatively thin sheet metal reinforced by angle bars secured upon their upper surfaces, as clearly shown, and the motion imparted thereto is such that they will deliver a blow upon the plants which will be sufficient to dislodge the insects, the dead foliage and the bolls which may have been killed by the insects, without at the same time injuring the tender stems or the bolls which have not been attacked. The beaters are disposed longitudinally of the machine and their inner edges are spaced apart and located at opposite sides of the medial longitudinal line of the machine.

The machine is substantial in construction so that it will withstand rough usage and will operate efficiently but is not complicated in its arrangement.

Having thus described the invention, I claim:

1. The combination of a portable frame, a longitudinally extending pan suspended on the frame at the center thereof, beaters suspended on the frame above and at the opposite sides of the pan, and means for vertically oscillating the beaters whereby to move their inner edges toward and from the pan.

2. The combination of a portable frame, a pan suspended on the frame and extending longitudinally thereof at the center of the same, pivot members suspended on the frame and extending longitudinally thereof at the sides of the same, beaters hinged upon said pivot members and extending inwardly and upwardly therefrom over the pan, means for oscillating the beaters, and means for vertically adjusting the pivot members and the beaters.

3. The combination of a portable frame, a pan suspended upon the frame at the center thereof, pivot members suspended upon the frame at the sides of the same, hinge elements mounted upon said pivot members and extending inwardly and upwardly therefrom, abutments upon the pivot members adjacent said hinge elements, coiled springs disposed about the pivot members between the said abutments and the said hinge elements and having their ends engaged respectively with the abutment and the hinge element, beaters carried by the hinge elements, and means mounted on the frame and connected with the beaters to rock the same about the pivot members.

4. The combination of a portable frame, a pan suspended centrally thereon, pivot members suspended on the frame at the sides thereof, beaters hingedly mounted upon the pivot members and extending inwardly and upwardly therefrom over the pan, means for rocking the beaters, and deflectors carried by the front ends of the pivot members and extending inwardly and rearwardly therefrom and terminating adjacent the front end of the pan.

5. The combination of a portable frame, hangers mounted on the frame, loops secured to the lower ends of the hangers and disposed transversely of the frame, longitudinal bars extending between the loops, a pan extending through the loops and resting on said bars, means for preventing displacement of the pan, and rocking beaters mounted on the frame above and at the sides of the pan to cooperate therewith in catching insects.

6. The combination of a portable main frame, wheels supporting said frame, a shaft mounted upon the main frame across the rear end thereof, means whereby said shafts may be rotated from the ground wheels, supplemental frames fitted about said shaft and extending forwardly therefrom, means on the main frame for adjustably supporting the front ends of the supplemental frames, crank shafts journaled in the front ends of the supplemental frames, operative connections between the said crank shafts and the first-mentioned shaft, beaters suspended on the main frame and operatively connected with the crank shafts, and a pan suspended on the frame below and between the beaters.

7. The combination of a portable main frame, a rock shaft mounted on the frame adjacent the forward end thereof, cranks on said rock shaft, a second rock shaft on the frame adjacent the rear end thereof, cranks on said rear shaft, connecting rods pivoted to and extending between the cranks on the two shafts, means for rocking the first-mentioned shaft and securing it in a set position, suspending cranks secured upon each shaft, hangers attached to and depending from said suspending cranks, a pan carried by some of said hangers, beaters carried by the other hangers and arranged above and at the sides of the pan, and means for rocking the beaters.

In testimony whereof I affix my signature.

EDGAR H. TRICK. [L. S.]